UNITED STATES PATENT OFFICE 2,499,097

THERMOREVERSIBLE GELS OF HYDROLYZED VINYL FLUORIDE/VINYL ACETATE COPOLYMERS

Benjamin W. Howk and Louis Plambeck, Jr., Wilmington, Del., assignors to E. I. du Pont de Nemours & Company, Wilmington, Del., a corporation of Delaware No Drawing. Application September 21, 1945, Serial No. 617,928

3 Claims. (Cl. 260—29.6)

This invention relates to interpolymers and more particularly to certain interpolymers of vinyl fluoride with vinyl esters of organic acids, and to methods for obtaining the same. Still more particularly said invention relates to hydrolyzed interpolymers of vinyl fluoride with vinyl esters of organic monocarboxylic acids containing limited proportions of vinyl fluoride.

This invention has as an object the provision of interpolymers of vinyl fluoride with vinyl esters of organic monocarboxylic acids containing a relatively small proportion of fluorine atoms. Further objects are interpolymers which contain hydroxyl groups and fluorine atoms and which have the property of forming thermally reversible gels in dilute water and alcohol-water solutions. Additional objects will become apparent from an examination of the following description and claims.

These and other objects and advantages are accomplished according to the herein-described invention which comprises macromolecular interpolymers of vinyl fluoride with a vinyl ester of an organic monocarboxylic acid, said interpolymers having the empirical formula:

wherein R is an acyl radical of an organic, monocarboxylic acid free from non-benzenoid carbon-to-carbon unsaturation in which any carbon atom alpha to the carbon atom in the carboxyl group of said acid is attached to at least one but not more than three carbon atoms, and wherein $x$, $y$ and $z$ are numbers, the ratio of $x$ to $y+z$ being within the range of from 1:30 to 1:6 and the ratio of $y$ to $z$ being within the range of from 0:1 to 1:0.

In a more restricted embodiment this invention comprises a macromolecular hydrolyzed interpolymer of vinyl fluoride with a vinyl ester of an organic monocarboxylic acid, said hydrolyzed interpolymer having the empirical formula $(C_2H_3F)_x.(C_2H_3OH)_y.(C_2H_3OR)_z$ wherein R is an acyl radical of an organic, monocarboxylic acid free from non-benzenoid carbon-to-carbon unsaturation, in which any carbon atom alpha to the carbon atom in the carboxylic group of said acid is attached to at least one but not more than three carbon atoms, and wherein $x$, $y$ and $z$ are numbers, the ratio of $x$ to $y+z$ being within the range of from 1:30 to 1:6 (i. e., the mol ratio of the vinyl fluoride to vinyl organic ester in the interpolymer prior to hydrolysis being within the range of from 1:30 to 1:6) and the ratio of $y$ to $z$ being at least 19:1 (i. e., the interpolymer being at least 95% hydrolyzed). These hydroxyl-containing interpolymers can be dissolved in hot water or in hot mixtures of water and methanol and water and ethanol containing not more than 25% of the alcohol, to produce solutions which are capable of forming thermally reversible gels on cooling.

In a still more restricted embodiment, this invention comprises a macromolecular hydrolyzed interpolymer of vinyl fluoride with a vinyl ester of an organic monocarboxylic acid, said hydrolyzed interpolymer having the empirical formula $(C_2H_3F)_x.(C_2H_3OH)_y.(C_2H_3OR)_z$ wherein R is an acyl radical of an acid having the general formula $C_nH_{2n+1}COOH$, in which $n$ is a number of the group consisting of zero and positive integers not greater than 3 and wherein $x$, $y$ and $z$ are numbers, the ratio of $x$ to $y+z$ being within the range of from 1:30 to 1:6, $z$ being substantially zero.

A preferred embodiment of this invention comprises solid, macromolecular, hydrolyzed interpolymers of vinyl fluoride with vinyl acetate, said hydrolyzed interpolymers having the empirical formula

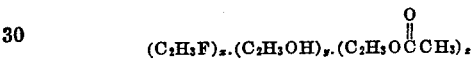

wherein $x$, $y$ and $z$ are numbers, the ratio of $x$ to $y+z$ being within the range of from 1:30 to 1:6, $z$ being substantially zero.

By the term "benzenoid carbon-to-carbon unsaturation," as employed herein and in the appended claim, is meant a C=C double bond present in a benzene nucleus.

The term "hydrolysis," as used herein and in the appended claims, is intended to include alcoholysis as well as hydrolysis with the use of water. Regardless of whether water or an alcohol is used to split off the carboxylic ester groups in the interpolymer, the product is the same.

By the phrase "completely hydrolyzed interpolymer," as employed herein, is meant an interpolymer of vinyl fluoride and a vinyl ester of an organic monocarboxylic acid, in which all the carboxylic ester groups of the interpolymer are replaced by hydroxyl groups. The fluorine atoms of the interpolymer appear to be unaffected and are present in the hydrolyzed interpolymer.

The interpolymers of this invention are macromolecular organic compounds containing a plurality of recurring units, i. e., are high polymers, which are solids at room temperature, i. e., 20-25° C. More specifically, said polymers are organic compounds having a degree number, i. e., a degree of polymerization, of at least 100, as defined by Staudinger in Die hochmolekularen organischen Verbindungen (1932) cited by Marvel and Horning in 1 Gilman, Organic Chemistry, 2d ed., 1943 (741). In the unhydrolyzed interpolymers the recurring units are $C_2H_3F$ and $C_2H_3OR$ units, R being an acyl radical of an organic monocarboxylic acid free from non-benzenoid carbon-to-carbon unsaturation in which any carbon atom alpha to the carbon atom in the carboxyl group of said acid is attached to at least one but not more than three carbon atoms; in the partially hydrolyzed interpolymers said recurring units are $C_2H_3F$, $C_2H_3OH$ and $C_2H_3OR$ as hereinbefore defined; whereas in the completely hydrolyzed products the recurring units are $C_2H_3F$ and $C_2H_3OH$ units.

The following examples, in which proportions are in parts by weight unless otherwise specified, are given for illustrative purposes and are not intended to place any restrictions on the herein-described invention.

*Example I*

In a pressure vessel are placed 360 parts of distilled water, 1.2 parts of commercial sodium lauryl sulfate, 1.2 parts of sodium dihydrogen phosphate monohydrate, 1.2 parts of ammonium persulfate, and enough dilute sodium hydroxide solution to bring the pH to 6.15. The vessel is swept with nitrogen to remove all traces of oxygen, and 129 parts of a 5.9% solution of vinyl fluoride in vinyl acetate are added. The vessel free space is again swept with nitrogen, the vessel closed and agitated at 40° C. for 18 hours under autogenous pressure. The vessel is then opened and the resultant interpolymer dispersion is removed and divided into two equal portions.

One portion of the dispersion is coagulated by the addition of a saturated sodium chloride solution and the precipitated interpolymer is washed with water until free from dispersing agent and residual salts. The 62 parts of vacuum dried vinyl fluoride/vinyl acetate interpolymer obtained represent a 96% yield of product. Upon analysis it is found to contain 1.6% fluorine corresponding to a vinyl fluoride content of 3.9% or a vinyl fluoride/vinyl acetate mol ratio of 1:13. A 5% solution of the interpolymer in chloroform has a viscosity of 90 poises at 25° C. A polyvinyl acetate made by the same method has a viscosity of 75 poises.

The second portion of the interpolymer dispersion (containing 62 parts of interpolymer) is hydrolyzed as follows by the technique for hydrolyzing ethylene/vinyl acetate interpolymers as described in copending U. S. application Serial No. 578,345, filed February 16, 1945, now U. S. Patent No. 2,467,774. The dispersion is cooled to 5° C. by the addition of cracked ice and a cold (5° C.) solution of 30 parts of sodium hydroxide, 80 parts of methanol, and 200 parts of water and ice is added with vigorous stirring. After 10 minutes of stirring in the cold, the mixture is heated to 80–85° C. over 25 minutes. At this stage the solution is still cloudy and rather thin. Addition of another 80 parts of methanol followed by 10 minutes more at 80° C. gives a clear viscous solution which is neutralized with hydrochloric acid, filtered, cooled, and the hydrolysis product precipitated by the addition of sodium chloride to saturate the solution. The precipitated vinyl fluoride/vinyl alcohol interpolymer is washed with water until free from salt and then dried. The 24 parts of dry product represents a 73% yield. On analysis this material is found to contain 2.0% fluorine, corresponding to a vinyl fluoride content of about 5% or a vinyl fluoride/vinyl alcohol mol ratio of 1:20. The polymer is soluble in hot water, hot water-methanol, water-ethanol, and water-dioxane mixtures but is insoluble in the cold solvents. Warm (50–60° C.) water and water-alcohol (80 parts water to 15 parts alcohol) solutions containing 4–5% of polymer set rapidly to fairly rigid gels on cooling to room temperature. For example, a 50 mil film of polymer solution on a glass plate (plate temp. 25–30° C.) sets to such an extent in two minutes that the plate can be placed on edge without fear of the film running. More dilute solutions (2–3%) gel on standing overnight. All of these gels liquefy on re-heating in much the same manner that gelatin gels do.

The films obtained by drying the gels are clear and brilliant and superficially resemble polyvinyl alcohol films. However, while ordinary polyvinyl alcohol films are slimy and weak after soaking in water, the hydrolyzed vinyl fluoride/vinyl acetate interpolymer films of this invention are tough and rubbery. For example, a 2 mil film of the fluorine modified polyvinyl alcohol prepared as above has a tensile strength of 6600 lbs./sq. in. at an elongation of 800% after soaking in water at 25° C. for 24 hours. Linear swelling of 2 mil films after immersion in water at 30° C. for 30 minutes is only 25%. In the same tests, films prepared in the same manner from commercial high viscosity type "B" (completely hydrolyzed polyvinyl alcohol show wet tensile strengths of less than 300 lbs./sq. in. while the linear swelling is 70%.

In a water jacketed reaction vessel fitted with a stirrer and reflux condenser are placed 240 parts of methanol and 3.5 parts of potassium hydroxide. The mixture is heated until methanol is refluxing, when a solution of 25 parts of the vinyl fluoride/vinyl acetate interpolymer (prepared as above) in 360 parts of benzene and 320 parts of methanol is added slowly over 45 minutes. The reaction mixture is heated at reflux for another 30 minutes, cooled and the precipitate of hydrolyzed product is separated by filtration, washed with methanol, and dried. The dry product, 13 parts, represents nearly a quantitative yield. Films of this product have a wet tensile strength of 3260 lbs./sq. in. at an elongation of 610%. The tensile strength of this sample is less than that of the dispersion hydrolyzed sample described above probably because the washing with water in the dispersion process removes weak, water-sensitive, low molecular weight portions of the polymer.

*Example II*

In a jacketed, stainless steel pressure vessel are placed 80 parts of vinyl acetate monomer and an aqueous phase (pH 6.25) consisting of 160 parts water, 0.8 part commercial sodium lauryl sulfate, 0.8 part sodium dihydrogen phosphate monohydrate, and 0.8 part of ammonium persulfate. The vessel is closed and pressured to 50 lbs./sq. in. with oxygen-free nitrogen, the pressure released, and the process repeated. The vessel is then pressured to 20 lbs./sq. in. with vinyl fluoride and the pressure released. Hot water is circulated through the vessel jacket and the charge is heated to 50° C. with agitation, while vinyl fluoride is added to bring the pressure up to 75 lbs./sq. in. Heating at 50–52° C. with agitation is continued for a total of 3.5 hours, during which time the vinyl fluoride pressure is maintained at 65–95 lbs./sq. in. by additions as required.

After cooling and venting, the vessel is opened and the dispersion worked up as described in Example I to give 80.2 parts of vacuum dried vinyl fluoride/vinyl acetate interpolymer. The vinyl fluoride content as determined by analysis is 5.1% corresponding to a vinyl fluoride/vinyl acetate mol ratio of 1:10. A 5% solution of the polymer in chloroform has a viscosity of 50 poises.

The alkaline catalyzed methanolysis of 69 parts of the interpolymer prepared as above by the technique outlined in Example I gives 33.5 parts of hydrolyzed product. Upon analysis this material is found to have a vinyl fluoride content of about 10.4%, corresponding to a vinyl fluoride/vinyl alcohol mol ratio of 1:9. This material in 3–5% concentration in water and in water-alcohol (80 parts of water to 15 of alcohol) mixture yields rigid "ringing" gels on standing a short time at room temperature. Tests indicate that gelation begins at temperatures as high as 50–60° C. for solutions of this concentration range. Films cast from the solutions show tensile strengths of 4170 lbs./sq. in. at 730% elongation after soaking in water at 25° C. for 24 hours. Linear swelling of the films is only 8% after soaking in water at 30° C. for 30 minutes.

Example III

By the procedure outlined in Example I, 360 parts of a vinyl fluoride/vinyl acetate mixture containing 4–5% of vinyl fluoride are heated for 16 hours at 40° C. with 1440 parts of an aqueous phase (pH 6.1) consisting of 3.6 parts of ammonium persulfate and 3.6 parts of sodium dihydrogen phosphate monohydrate dissolved in water. By precipitation of the polymer from the dispersion obtained, the yield is found to be 98%. Analysis of the material shows a vinyl fluoride content of 1.7% corresponding to a vinyl fluoride/vinyl acetate mol ratio of 1:30. The intrinsic viscosity of the polymer is found to be 5.27.

Direct hydrolysis of the interpolymer dispersion is carried out by the procedure described in Example I except that the mixture, after completion of the hydrolysis step, is allowed to stand overnight. During this time the mixture sets to a stiff white gel which is then cut into small pieces and washed in water until free from salts. The yield of dry product amounts to 91% of the theoretical. Analysis shows the hydrolyzed polymer to contain 3.8% vinyl fluoride, corresponding to a vinyl fluoride/vinyl alcohol mol ratio of 1:27. A 5% solution of this material in water : ethanol (80 parts : 15 parts) gels after several hours at room temperature. Films cast from the solution are clear and brilliant with little or no trace of yellowish coloration. Tensile tests of the film give the following results:

| | Tensile Strength | Elongation |
|---|---|---|
| | Lbs./sq. in. | Per Cent |
| Dry test (Films conditioned 48 hrs. at 50% relative humidity) | 10,300 | 330 |
| Wet test (Films soaked at 25°C. in water for 24 hrs.) | 6,300 | 720 |

Linear swelling of the film is only 16% after soaking in water at 30° C. for 30 minutes.

Example IV

In a stainless steel autoclave are placed 1800 parts of vinyl acetate and an aqueous phase (pH 6.1) consisting of 5400 parts distilled water, 17.5 parts sodium dihydrogen phosphate monohydrate, 20 parts of commercial sodium lauryl sulfate, 16 parts of ammonium persulfate, and 1.3 parts of sodium hydroxide. The autoclave is purged with nitrogen and pressured with vinyl fluoride as described in Example II. The charge is then heated for 4 hours at 55–67° C. under a vinyl fluoride pressure of 60–69 lbs./sq. in. with addition of vinyl fluoride as required to maintain the pressure in this range. Determination of the interpolymer content of the dispersion obtained indicates a conversion of 100% based on the vinyl acetate charged. Analysis shows this interpolymer to contain 6.9% vinyl fluoride, corresponding to a vinyl fluoride/vinyl acetate ratio of 1:7. Direct hydrolysis of the interpolymer dispersion by the technique described in Example III gives a hydrolyzed product containing 11.1% vinyl fluoride, corresponding to a vinyl fluoride/vinyl alcohol ratio of 1:8. This product in a dilute water-alcohol solution gels very rapidly at room temperature.

In order to show more clearly the effect of the vinyl fluoride ratio on the properties of the hydrolyzed vinyl fluoride/vinyl acetate interpolymers, a number of vinyl fluoride/vinyl acetate interpolymers of varying vinyl fluoride contents were prepared and hydrolyzed as outlined in Examples I and II. In the following table, the gelling properties of 5% water-ethanol solutions of the hydrolyzed products are compared. The vinyl fluoride/vinyl acetate mol ratios are given for the interpolymers from which the hydrolyzed products were prepared. The solutions were prepared by dissolving the interpolymers in the heated solvent mixture. The solution was then permitted to cool at room temperature and the time for gelling was observed.

Table

| Vinyl fluoride/vinyl acetate mol ratio | Gelling properties of a 5% solution of the hydrolysis product in a mixture of 80 parts of water and 15 parts of ethanol |
|---|---|
| 1:30 | gels after 4–5 hours at room temperature. |
| 1:18 | gels within a few minutes at room temperature. |
| 1:13 | Do. |
| 1:10 | very stiff gel within a few minutes at room temperature. |
| 1:6 | Do. |

We have discovered that certain macromolecular interpolymers of vinyl fluoride with a vinyl ester of an organic monocarboxylic acid, namely, macromolecular interpolymers having the empirical formula

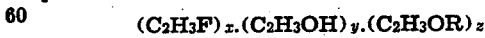

$(C_2H_3F)_x.(C_2H_3OH)_y.(C_2H_3OR)_z$ wherein R is an acyl radical of an organic monocarboxylic acid free from non-benzenoid carbon-to-carbon unsaturation, in which any carbon atom alpha to the carbon atom in the carboxyl group of said acid is attached to at least one but not more than three carbon atoms, and wherein $x$, $y$ and $z$ are numbers, the ratio of $x$ to $y+z$ is within the range of from 1:30 to 1:6 and $y$ is zero, when substantially completely hydrolyzed (i. e., 95% to 100% hydrolyzed), e. g., according to the method which will be more completely described hereinafter, provide novel interpolymers which are unique in that they can be dissolved in hot water or hot water-methanol or water-ethanol mixtures containing not more than about 25% alcohol to produce solutions which are capable of forming thermally reversible gels on cooling. Said interpolymers can be prepared most advantageously by interpolymerizing one molar proportion of vinyl fluoride with from six to 30 molar proportions of a vinyl ester of an organic, monocarboxylic acid which is free from non-benzenoid carbon-to-carbon unsaturation, and in which any carbon atom alpha to the carbon in the carboxyl group of said acid is attached to at least one but not more than three carbon atoms, e. g., vinyl acetate, at temperatures of 70° C. or less and at pressures up to 200 lbs./sq. in. in the presence of a peroxy compound as catalyst. Included among peroxy compounds operative as catalysts are: ammonium persulfate, benzoyl peroxide, hydrogen peroxide, tert. butyl hydroperoxide, diethyl peroxide, sodium perborate diacetyl peroxide, tertiary butyl, perbenzoate, and the like.

While this invention has been illustrated with particular reference to interpolymers of vinyl fluoride with vinyl acetate, it is to be understood that it is broadly applicable to macromolecular interpolymers of vinyl fluoride with any vinyl ester of a monocarboxylic organic acid provided the mol ratio of vinyl fluoride to vinyl organic ester is within the range of from 1:30 to 1:6 and further provided that said vinyl organic ester is the vinyl ester of a monocarboxylic organic acid which is free from non-benzenoid carbon-to-carbon unsaturation and in which any carbon atom alpha to the carbon atom in the carboxyl group of said acid it attached to at least one but not more than three carbon atoms. Included among examples of said interpolymers are those of vinyl fluoride with vinyl formate, vinyl acetate, vinyl propionate, vinyl isobutyrate, vinyl butyrate, vinyl stearate, vinyl benzoate, vinyl cyclohexanoate, vinyl hexadecanoate, vinyl tetradecanoate, vinyl toluate, vinyl naphthoate, vinyl chloroacetate and the like.

Although any macromolecular interpolymer of vinyl fluoride with a vinyl organic ester as hereinbefore defined is operative in our invention, provided the mol ratio of vinyl fluoride to vinyl organic ester is within the range of from 1:30 to 1:6, hydrolyzed interpolymers having optimum properties are obtained most readily when the interpolymer subjected to hydrolysis is one of vinyl fluoride with a vinyl ester of an organic acid having the general formula $C_nH_{2n+1}COOH$, wherein $n$ is a number of the group consisting of zero and positive integers not greater than 3. Inasmuch as the acid group of the vinyl organic ester is removed by hydrolysis, it is usually most economical to use an interpolymer of vinyl fluoride with vinyl acetate which is the most readily available vinyl organic ester.

Hydrolysis of the aforementioned vinyl fluoride/vinyl organic ester interpolymers is readily effected by cooling to from 5° C. to 10° C. an aqueous dispersion containing from 15% to 30% by weight of the interpolymer of vinyl fluoride and vinyl ester of organic monocarboxylic acid, mixing therewith a methanol-water solution of the theoretically required quantity of sodium hydroxide at a temperature within the range of from 5° C. to 10° C. and heating the resultant mixture at a temperature within the range of from 80° C. to 85° C. until a clear solution is obtained. This solution is neutralized, filtered and the resultant hydrolyzed product is precipitated by the slow addition, with stirring, of enough sodium chloride to saturate the solution. The product is filtered off, washed with water until free from salts and dried.

The hydrolysis of the carboxylic ester groups of the forementioned interpolymers may be partial or complete depending upon the time of reaction. However, in order to provide compounds capable of forming thermally reversible gels, the hydrolysis should be permitted to proceed until the interpolymer is substantially completely hydrolyzed, i. e., until from about 95% to 100% of the carboxylic ester groups are replaced by hydroxyl groups. The product obtained upon complete hydrolysis is the same regardless of the vinyl organic ester in the interpolymer.

The reversible gel-forming products of this invention are macromolecular hydrolyzed interpolymers of vinyl fluoride with a vinyl ester of an organic monocarboxylic acid, said interpolymers having the empirical formula $$(C_2H_3F)_x.(C_2H_3OH)_y.(C_2H_3OR)_z$$

wherein R is an acyl radical of an organic monocarboxylic acid free from non-benzenoid carbon-to-carbon unsaturation, in which any carbon atom alpha to the carbon atom in the carboxyl group of said acid is attached to at least one but not more than three carbon atoms, and wherein $x$, $y$ and $z$ are numbers, the ratio of $x$ to $y+z$ being within the range of from 1:30 to 1:6 and the ratio of $y$ to $z$ being at least 19:1. Included among examples of the radical R in the aforementioned empirical formula are the acyl radicals of the following acids: formic, acetic, propionic, isobutyric, butyric, stearic, benzoic, cyclohexanoic, hexadecanoic, tetradecanoic, toluic, naphthoic and choloracetic acids and the like.

While all hydrolyzed interpolymers having the empirical formula $$(C_2H_3F)_x.(C_2H_3OH)_y.(C_2H_3OR)_z$$

as hereinbefore defined, wherein R is an acyl radical of any organic monocarboxylic acid, free from non-benzenoid carbon-to-carbon unsaturation, in which any carbon atom alpha to the carbon atom in the carboxyl group is attached to at least one but not more than three carbon atoms, are reversible gel-forming products, preferred hydrolyzed interpolymers are those in which R has the general formula $$-\overset{O}{\underset{\|}{C}}C_nH_{2n+1}$$

wherein $n$ is a member of the group consisting of zero and positive integers within the range of from 1 to 3, since said hydrolyzed interpolymers are most readily obtained and have optimum properties. Hydrolyzed interpolymers in which R is $$-\overset{O}{\underset{\|}{C}}-CH_3$$

are obtained most economically and are, therefore, preferred in most instances.

The ratio of $y$ to $z$ in the hydrolyzed interpolymers of this invention, having the empirical formula $$(C_2H_3F)_x.(C_2H_3OH)_y.(C_2H_3OR)_z$$

as hereinbefore defined, should be at least 19:1, in order to provide reversible gel-forming products, while the most useful products are those in which $z$ is substantially zero. It is to be understood that the ratio of $x$ to $y+z$ in said empirical formula must be within the range from 1:30 to 1:6. When $z$ in the above formula is zero, i. e., when the interpolymer is completely hydrolyzed, the aforementioned mol ratio corresponds to from 3.4% to 14.8% of vinyl fluoride by weight based on the total interpolymer.

Substantially completely hydrolyzed interpolymers in which said ratio of $x$ to $y+z$ is within the range of from 1:30 to 1:6 are soluble in hot water (i. e., at 70°-100° C.) and in hot (i. e., 70°-100° C.) mixtures of water and an alcohol, having the general formula $C_nH_{2n+1}OH$ wherein $n$ is a positive integer within the range of from 1 to 4, containing up to 25% by weight of the alcohol. On cooling to room temperature, i. e., 25° C., the resultant solutions, provided they contain not less than 5% by weight of the hydrolyzed interpolymer, all rapidly form reversible gels, i. e., they form reversible gels within the period of not more than five hours. In addition, many of said solutions containing as little as from 2% to 5% by weight of the hydrolyzed interpolymer also form reversible gels within the period of not more than five hours. These rigid gels again revert to solution when warmed to the original temperature of solubility which is usually within the range of from 60° C. to 85° C. On the other hand, substantially completely hydrolyzed interpolymers as hereinbefore defined, in which however the ratio of $x$ to $y+z$ is without the range of from 1:30 to 1:6, do not have this property of forming thermally reversible gels within a period of from four to five hours in dilute aqueous or in dilute aqueous-alcohol solutions containing less than 25% alcohol. Hydrolyzed interpolymers in which the ratio of $x$ to $y+z$ is greater than 1:6, are too insoluble in hot water and in hot water-ethanol (or methanol) mixtures containing less than 25% alcohol to form thermally reversible gels on cooling to room temperature. Said compositions are soluble in water-ethanol mixtures containing larger proportions of ethanol, i. e., more than 25% ethanol, but the larger proportions of alcohol inhibit gel formation in the solutions. In general, it has been found that the more alcohol used in the water-alcohol solutions the less gelling tendency there is in the solutions of the hydrolyzed interpolymers. Hydrolyzed interpolymers, in which the ratio of $x$ to $y+z$ is less than 1:30 do not form gels sufficiently rapidly to be of practical value, i. e., do not form gels within the space of five hours on cooling a solution thereof to room temperature, i. e., to 25° C.

This invention, therefore, provides a hydrolyzed interpolymer containing limited proportions of vinyl fluoride which is entirely different from any previously prepared interpolymer of vinyl fluoride/vinyl alcohol in that the hydrolyzed interpolymers of this invention form thermally reversible gels. This property is of special advantage in enabling these hydrolyzed interpolymers to be used as replacements for gelatin in photographic applications where existing equipment is designed to take advantage of the gelling property of gelatin. Light-sensitive silver halide emulsions can be prepared readily using the hydrolyzed interpolymers of this invention and can be coated on film base and processed in the same manner as gelatin-silver halide emulsions.

The substantially completely hydrolyzed products of this invention can also be used to form films which have wet tensile strengths as much as twenty times those of comparable films had from commercial high viscosity completely hydrolyzed polyvinyl acetate. In addition, these products can be used for the preparation of textile fibers of high tenacity. For example, filaments of substantial completely hydrolyzed vinyl fluoride/vinyl acetate interpolymers falling within the scope of this invention can be stretched from 400% to 700% in oil at 120° C.-150° C. to give oriented filaments which have tenacities of 4.7 to 6.3 gs./denier with elongations of 5% to 10%.

The unhydrolyzed interpolyers of this invention are useful as adhesives, paper impregnating agents, protective lacquers for metal, etc. For these uses the presence of vinyl fluoride in the interpolymer with the vinyl ester reduces the solubility of the product in alcohols and in addition gives somewhat better water resistance.

As many apparently widely different embodiments of this invention may be made without departing from the spirit and scope thereof, it is to be understood that we do not limit ourselves to the specific embodiments thereof except as defined in the appended claims.

Having described the present invention, the following is claimed as new and useful:

1. A thermally reversible gel essentially consisting of from 2 to 5% by weight of a hydrolyzed interpolymer the recurring units of which consist of one vinyl fluoride radical and from six to thirty radicals of the group consisting of vinyl alcohol and vinyl esters of an organic monocarboxylic acid free from non-benzenoid carbon-to-carbon unsaturation, in which any carbon atom alpha to the carbon atom in the carboxyl group of said acid is attached to at least one but not more than three carbon atoms, and wherein the ratio of vinyl alcohol to vinyl ester radicals is at least 19 to 1, and a solvent consisting of water and up to 25% of alcohol based on the weight of the solvent.

2. A thermally reversible gel essentially consisting of from 2 to 5% by weight of a hydrolyzed interpolymer the recurring units of which consist of one vinyl fluoride radical and from six to thirty radicals of the group consisting of vinyl alcohol and vinyl acetate, and wherein the ratio of vinyl alcohol to vinyl acetate radicals is at least 19 to 1, and a solvent consisting of water and up to 25% of alcohol based on the weight of the solvent.

3. A gel which when heated to a temperature of about 85° C. reverts to a liquid essentially consisting of an aqueous solution of from 2 to 5% by weight of a hydrolyzed interpolymer, the recurring units of which consist of one vinyl fluoride radical and from six to thirty vinyl alcohol radicals.

BENJAMIN W. HOWK.
LOUIS PLAMBECK, JR.

REFERENCES CITED

The following references are of record in the file of this patent:

UNITED STATES PATENTS

| Number | Name | Date |
|---|---|---|
| 2,224,663 | Berg et al. | Dec. 10, 1940 |
| 2,406,717 | Thomas | Aug. 27, 1946 |
| 2,419,009 | Coffman et al. | Apr. 14, 1947 |
| 2,419,010 | Coffman et al. | Apr. 15, 1947 |

FOREIGN PATENTS

| Number | Country | Date |
|---|---|---|
| 396,186 | Great Britain | Aug. 3, 1933 |
| 540,127 | Great Britain | Oct. 7, 1941 |